United States Patent [19]
Atchley et al.

[11] 3,960,218
[45] June 1, 1976

[54] GRASS-CLEARING DEVICE FOR LAWN-SPRINKLER HEADS

[76] Inventors: Fenimore Edward Atchley, 23333 Ridge Route Drive, No. 37; Betty Lou Gilliam, 24562 Blackfoot Drive, both of El Toro, Calif. 92630

[22] Filed: July 2, 1975

[21] Appl. No.: 592,548

[52] U.S. Cl.................................... 172/13; 30/310; 30/DIG. 7; 172/373; 175/384; 175/408; 175/421; 294/19 R
[51] Int. Cl.²............................................. A01G 3/06
[58] Field of Search................... 172/13, 18, 19, 20, 172/24, 25, 26, 518, 373; 30/286, 287, 293, 300, 301, 302, 303, 310, 316, 320, DIG. 7; 175/384, 408, 421; 239/201; 294/19 R, 34, 50.6, 50.7, 50.8, 50.9; 81/177 A

[56] References Cited
UNITED STATES PATENTS

| | | | |
|---|---|---|---|
| 330,580 | 11/1885 | Grimm | 175/384 |
| 776,903 | 12/1904 | Givens et al. | 175/384 |
| 1,857,383 | 5/1932 | Johnson | 30/316 |
| 2,615,246 | 10/1952 | Littig | 30/316 |
| 2,670,537 | 3/1954 | Campbell | 30/300 |
| 2,691,823 | 10/1954 | Dombrowski | 30/300 |
| 2,723,453 | 11/1955 | Espitallier | 172/518 |
| 2,764,926 | 10/1956 | Heimbigner | 172/18 |
| 3,062,299 | 11/1962 | Koepfinger | 30/316 |
| 3,747,213 | 7/1973 | Green et al. | 30/300 X |
| 3,814,189 | 6/1974 | Thompson | 172/13 |

*Primary Examiner*—Paul E. Shapiro
*Assistant Examiner*—Richard T. Stouffer

[57] ABSTRACT

A grass-clearing device for lawn sprinkler heads, wherein the grass and sod surrounding the in-line, sprinkler head is to be trimmed therefrom, to provide an unobstructed flow of water from the sprinkler head. The device comprises a pair of adjustable, cutting blades slidably secured to a support body, the blades being provided with a centering mechanism whereby the blades can be adjusted for proper cutting relative to the size of the sprinkler head. A telescoping, handle shaft is secured to the support body, the upper end of the handle including a foldable, hand grip connected thereto.

2 Claims, 5 Drawing Figures

U.S. Patent June 1, 1976 3,960,218
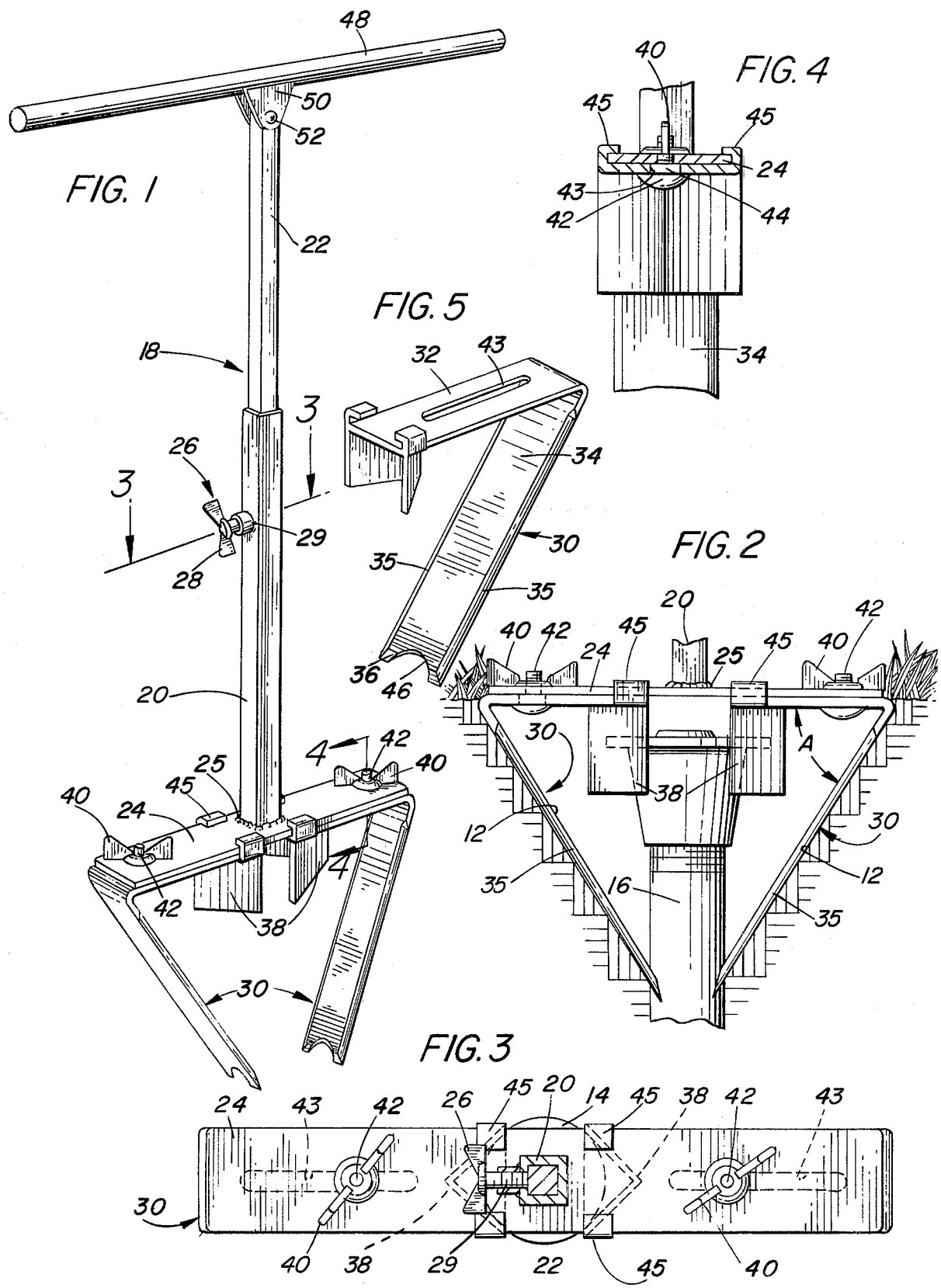

GRASS-CLEARING DEVICE FOR LAWN-SPRINKLER HEADS

BACKGROUND OF THE INVENTION

1. Field of the Invention

This invention relates to devices for trimming and clearing grass and sod, and more particularly to a trimming-and-clearing device for grass and sod disposed about sprinkler heads, wherein the heads are connected to an underground, watering system.

2. Description of the Prior Art

As is well known in the art, various types of grass-and-sod trimming devices are presently available. However, several problems and difficulties are encountered in providing proper cutting of the grass and sod around sprinkler heads that are positioned at ground level or slightly there below.

Generally, underground-sprinkler systems include underground piping that is interconnected in such a manner that a particular given area can be watered by a plurality of sprinkler heads equally spaced therein. These sprinkler heads are supported by upstanding risers at spaced intervals within the lawn, said risers having the sprinkler heads secured thereto at ground level or just below the ground level. Usually, a circular recess is provided in the ground at each sprinkler head and risers to permit an unobstructed operation of the flow of water from the sprinkler head.

At the time of the original installation of a sprinkler system, a recess is provided about each head; however, during subsequent operation thereof, the recesses tend to partially fill with dirt, and grass tends to grow closely around each sprinkler head. When this grass is permitted to extend over the sprinkler heads, the flow of water therefrom will be obstructed. Thus, proper watering of the area will be restricted. Heretofore, each sprinkler head had to be cleared of grass and dirt by hand and with various other devices such as grass shears and the like. In most cases, in order to clear the grass and dirt from around each head it was necessary to bend over or kneel adjacent thereto. This method was extremely tedious, laborious and time-consuming.

Several patents have issued with respect to the above, but the applicants feel that none have been adequate to solve all the related problems.

As an example, U.S. Pat. No. 3,064,353 shows a cup-like trimming tool. It does not provide for clearing or removing the surrounding dirt.

U.S. Pat. No. 2,615,246 to A. L. Littig illustrates another type of lawn trimmer.

The patent to Espitallic (U.S. Pat. No. 2,723,453) and the one to Heimbigner (U.S. Pat. No. 2,764,926) are closest in solving the problems; however, these, also, are limited in their operation or are too complicated in their structure.

U.S. Pat. Nos. 1,765,288; 2,691,823; and 2,733,100 are herein cited as of interest in the art.

SUMMARY OF THE INVENTION

This invention provides a device for not only trimming the lawn area around sprinkler heads disposed in the ground, but also includes a means to ream a recess around the sprinkler head, wherein the recess is formed with an annular wall having substantially the same angle as that of the spray of water being discharged from the sprinkler head.

The device comprises a pair of oppositely disposed cutting blades having dual-cutting edges formed thereon. Each blade is adjustably attached to a support body having a centering means affixed to each blade in such a manner that the adjustment of the blades can be selectively set so that they are properly spaced apart relative to the size of the sprinkler head.

A telescoping, vertical, handle shaft is secured to the support body, wherein the upper member is adjustable in height by a locking means attached to the lower, tubular member. A foldable, handle grip is pivotally secured to the free end of the upper member, whereby the handle grip is folded out of the way for storage.

OBJECTS AND ADVANTAGES OF THE INVENTION

The present invention has for an important object a provision for a pair of cutting blades to be adjusted to a proper distance apart relative to the size of the sprinkler head.

It is another object of the invention to provide a grass-clearing device for lawn-sprinkler heads, wherein the handles thereof are adjustable to various heights to accommodate the individual user thereof.

It is still another object of the invention to provide cutting blades that are readily removable from the device, so as to be sharpened without difficulty.

It is a further object of the present invention to provide a grass-clearing device for lawn-sprinkler heads, wherein the cutting blades are formed at a cutting angle substantially the same as the angle of the water discharging from the sprinkler head, whereby the wall of the recess formed thereby is shaped accordingly.

A still further object of the invention is to provide a device of this character that is simple and rugged in construction.

It is still another object of this invention to provide a device of this character having a relatively long working life.

It is a further object of the invention to provide a device of this character that is relatively inexpensive to manufacture.

The characteristics and advantages of the invention are further sufficiently referred to in connection with the accompanying drawings, which represent one embodiment. After considering this example, skilled persons will understand that variations may be made without departing from the principles disclosed and I contemplate the employment of any structures, arrangements or mode of operation that are properly within the scope of the appended claims.

DESCRIPTION OF THE DRAWINGS

Referring more particularly to the accompanying drawings, which are for illustrative purposes only:

FIG. 1 is a perspective view of the present invention;

FIG. 2 is a side-elevational view of the lower portion thereof, showing the device reaming a recess about a sprinkler head;

FIG. 3 is an enlarged, cross-sectional view taken substantially along line 3—3 of FIG. 1;

FIG. 4 is an enlarged, cross-sectional view taken substantially along line 4—4 of FIG. 1;

FIG. 5 is a perspective view of a cutting blade of the present invention.

DESCRIPTION OF THE PREFERRED EMBODIMENT

Referring more particularly to the drawings, there is shown a grass-clearing device, indicated generally at 10. As illustrated in FIG. 2, this type of device is used to form an inverted, conical recess 12 about the sprinkler head 14. The sprinkler head of this type is attached to a riser pipe 16 which, in turn, is connected to an underground, sprinkler system — which is well known in the art and is, therefore, not shown herein.

Said grass-clearing device comprises a telescoping, handle shaft, generally designated by numeral 18, having a lower, tubular member 20. This member 20 has a square-shaped bore therethrough so designed as to slidably receive a second, upper member 22 having a matching, cross-sectional configuration. The lower, tubular member is secured to the central portion of a laterally extended, support body 24. Any suitable means may be used to secure the two elements together, and is herein shown as being welded as at 25.

Included within the handle shaft 18 is a locking means 26. Said locking means provides the locking adjustment of the upper member 22 in a relative, elongated position to that of the lower member 20. Thus, the length of the handle shaft 10 can be positioned to various lengths, depending upon the individual user thereof, by loosening and tightening the wing screw 28 that is threadably received in bass 29, as seen in FIGS. 1 and 3.

Slidably attached to the body 24 are a pair of cutting blades, generally indicated at 30. Each blade comprises an inverted, substantially "L"-shaped configuration having a horizontal arm 32 and an angular, depending, cutting leg 34 — said cutting legs being provided with dual-cutting edges 35 terminating in a lateral, cutting edge 36, as can be clearly seen in FIG. 5.

Accordingly, as seen in FIG. 2, the combining of the two cutting blades 30 will form a somewhat triangular-shaped, cutting unit to form the recess 12 about sprinkler head 14. Each blade is bent at an approximate angle of about 22 ½°, as indicated at A in FIG. 2.

In order to provide the proper sized recess to conform to the diameter of the head 14, the blades also include centering means. Said centering means comprises a pair of angular, jaw-like members 38. Each jaw member 38 is secured to the free end of said arm 32. Thus, the jaws are in opposing relationship to each other — and are designed to engage the peripheral edge of the sprinkler head 14, as seen in FIG. 3.

When the device 10 is to be used with a system having the same type of sprinkler heads throughout, the cutting blades are adjusted thereto by an adjusting means comprising a wing nut 40 and screw 42, as seen in the cross-sectional view of FIG. 4. Also seen therein is arm 32 which is provided with an elongated slot 43 in which a square boss 44 of the screw 42 is received therein and held from rotation. The threaded portion of nut 42 extends through hole 45 disposed adjacent each free end of body 24, wherein said wing nut is attached.

In addition, there is included guide means arranged between the body 24 and the cutting blades 30, the guide means being inwardly bent tabs 45 which slidably receive body 24 therein. Hence, when the wing nut is loosened, the cutting blades can slide inwardly or outwardly from the center of the body 24 — whereby the screw 42 together with the tabs 45 prevent any lateral movement of the blades. Once locked into position and the device is rotated about the sprinkler head 14, the tabs 45 retain the blades in their proper cutting position.

It should also be noted, that in order to aid in the proper rotation about the sprinkler head, the free ends of the cutting leg are adapted with semi-circular notches 46 to receive the vertical pipe riser therein, as seen in FIG. 2.

The free end of shaft 22 has a handle grip 48 pivotally attached thereto, whereby the handle grip 48 can be folded for storage. The pivotal means joining the handle grip to the handle shaft can comprise any suitable means, but is herein shown as a pair of ears 50 affixed to the grip 48 in a suitable manner and pinned to shaft 22 by pin 52, which is illustrated in FIG. 1.

The invention and its attendant advantages will be understood from the foregoing description and it will be apparent that various changes may be made in the form, construction and arrangement of the parts of the invention without departing from the spirit and scope thereof or sacrificing its material advantages, the arrangement herein before described being merely by way of example, and I do not wish to be restricted to the specific form shown or uses mentioned, except as defined in the accompanying claims.

We claim:

1. A grass-clearing device for sprinkler heads related to underground water systems, wherein the device comprises:

a main-support body having holes disposed adjacent the free ends thereof;

a pair of cutting blades slidably attached to each of said free ends of said main-support body, wherein said cutting blade comprises:

a horizontal arm member having an elongated slot disposed therein and a free end, said elongated slot being arranged to be aligned with respective holes of said main-support body;

a depending, cutting, leg member formed as an integral part of said horizontal arm member, and bent inwardly thereof, having dual-cutting edges formed thereon, said leg member terminating with a free end;

wherein said cutting, leg member includes a lateral, cutting edge disposed at the free end of said cutting leg member, and wherein a semi-circular notch is formed therein;

a pair of tabs integrally formed as part of each said horizontal arm member said tabs being inwardly bent to slidably receive said main-support body therethrough, thereby preventing lateral movement of said cutting blades:

a pair of V-shaped, jaw members, each being secured adjacent said free end of each said horizontal arm member, wherein the jaw members are positioned opposite to each other, to receive one of said sprinkler heads therebetween;

means for adjusting said cutting blades to the proper distance apart with respect to the size of said sprinkler head, said means for adjusting said cutting blades being received in said elongated slots of said horizontal arm members and said holes disposed in said main-support body;

a handle shaft having a first tubular shaft, one end of which is affixed to said main body, and a second shaft adapted to be received in said first tubular shaft, said first and second shafts having matching cross-sectional configurations, whereby said second shaft is prevented from rotation therein;
a handle grip moveably attached to one end of said second shaft thereof, whereby said handle grip can be folded for storage; and
locking means mounted to said telescoping, handle shaft, whereby said handle shaft can be positioned at a pre-determined length.

2. A grass-clearing device as recited in claim 1, wherein said cutting blades form a substantially triangular configuration, whereby an inverted recess is formed about said sprinkler head, and wherein the angular displacement of said cutting blades is substantially equal to the angular displacement of the water being discharged from said sprinkler head.

* * * * *